United States Patent [19]
Farrow et al.

[11] 3,818,682
[45] June 25, 1974

[54] FLUE GAS TEMPERATURE CONTROL SYSTEM

[75] Inventors: Tom Jay Farrow, Tomahawk, Wis.; Thomas P. O'Donnell, Whitehouse, Ohio

[73] Assignee: Owens-Illinois, Inc., Toledo, Ohio

[22] Filed: Sept. 25, 1972

[21] Appl. No.: 291,885

[52] U.S. Cl. ............ 55/106, 55/4, 55/5, 55/135, 55/261, 55/267, 55/DIG. 7, 110/119, 159/1 R, 162/29, 423/659
[51] Int. Cl. ............ B03c 3/01
[58] Field of Search ........ 55/4, 5, 11, 106, 134, 55/135, 261, 267, DIG. 7; 110/8 R, 119; 159/1 R, 4 R; 162/29, 30, 31, 36, 41, 51; 423/659

[56] References Cited
UNITED STATES PATENTS
| | | | |
|---|---|---|---|
| 1,391,436 | 9/1921 | Welch | 174/14 BH X |
| 1,586,115 | 5/1926 | Pistor et al. | 55/73 X |
| 1,884,085 | 10/1932 | Miller | 201/4 X |
| 2,746,563 | 5/1956 | Harlow | 55/135 UX |
| 3,162,431 | 12/1964 | Muller et al. | 263/32 |
| 3,581,463 | 6/1971 | Roberts | 55/4 |
| 3,673,768 | 7/1972 | Leonard | 55/DIG. 38 |

FOREIGN PATENTS OR APPLICATIONS
| | | | |
|---|---|---|---|
| 237,993 | 5/1959 | Australia | 55/135 |
| 170,835 | 2/1922 | Great Britain | 55/135 |
| 177,117 | 3/1922 | Great Britain | 55/11 |
| 238,480 | 8/1925 | Great Britain | 55/11 |
| 344,550 | 3/1931 | Great Britain | 55/10 |
| 932,895 | 7/1963 | Great Britain | 55/134 |
| 699,549 | 12/1930 | France | 55/11 |

*Primary Examiner*—Dennis E. Talbert, Jr.
*Attorney, Agent, or Firm*—A. J. Steger

[57] ABSTRACT

Method and apparatus are provided for tempering exhaust or flue gases emanating from a chemical recovery furnace to maintain the gases at a temperature above the dew point thereby preventing condensation and significantly reducing corrosion. The apparatus of this invention includes a gas fired heating unit which heats up sufficient quantities of air to a temperature in excess of the dew point and directs this heated air into an exhaust duct of the recovery furnace and/or into a dust collection device, such as an electrostatic precipitator, located downstream of the recovery furnace. The introduction of heated air into the system may also be utilized to preheat the duct work and precipitator prior to initial operation of the recovery furnace to avoid condensation in a cold system during start-up.

1 Claim, 1 Drawing Figure

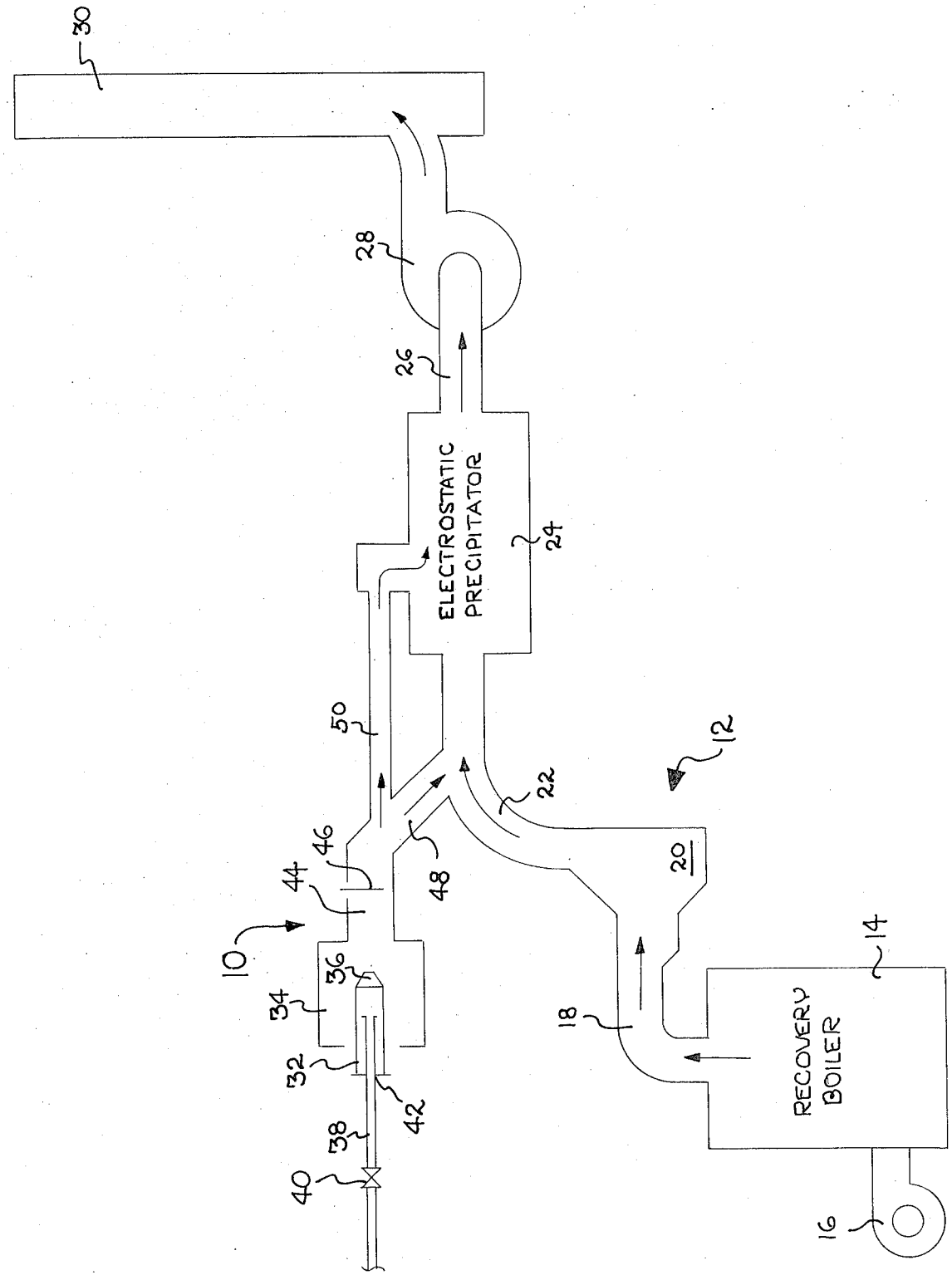

FLUE GAS TEMPERATURE CONTROL SYSTEM

BACKGROUND OF THE INVENTION

This invention generally pertains to chemical recovery boiler systems and, more particularly, it relates to a method and an apparatus for tempering exhaust gases emanating from a chemical recovery furnace to maintain the gases at a temperature above the dew point thereby preventing condensation and significantly reducing corrosion.

In a wood pulping process, for example, the pulping liquor is burned in a chemical recovery furnace to separate the lignin portion of the wood from the pulping liquor. The pulping liquor may then be recycled for reuse in the wood pulping process. The flue gas from the recovery furnace is fed into an evaporator or concentrator where the pulping liquor comes in contact with it prior to being introduced into the recovery furnace. In the evaporator the flue gas absorbs moisture from the pulping liquor and becomes highly saturated. The saturated flue gas is then passed through a dust collection device for removal of particulate matter before the flue gas is exhausted to the atmosphere.

Since the exhaust ducts and the dust collection device are at considerably lower temperatures than the highly saturated flue gas, the resulting cooling of the flue gas causes considerable condensation in the exhaust ducts and the dust collection device. This condensation has created severe corrosion problems in commercial installations resulting in the premature failure and replacement of the expensive dust collection devices and the adjoining ductwork.

Therefore, there has been a long-felt need for a successful means of controlling the temperature of the highly saturated flue gases emanating from a chemical recovery furnace to prevent condensation and the resulting corrosion of the components in the exhaust duct system.

SUMMARY OF THE INVENTION

It is, therefore, an object of this invention to provide a method and an apparatus for tempering flue gases from a chemical recovery furnace to maintain temperature above the dew point, and thereby prevent condensation and thus significantly reducing corrosion.

The apparatus of this invention includes a gas fired heating unit which is mounted within a heater housing adjacent to the exhaust duct system of a chemical recovery furnace. The heated air from the gas fired heating unit is introduced directly into the exhaust duct and also may be introduced into a dust collection device utilized with the exhaust duct system. This heated air serves to maintain the flue gases at a temperature above the prevailing dew point. In addition, the heated air may be utilized to preheat the exhaust ducts and the dust collection device during start-up of the recovery furnace. In either case the introduction of heated air prevents the temperature of the flue gases from dropping to the dew point. Thus, undesirable condensation and corrosion are avoided through the utilization of the apparatus and method of this invention.

Other objects, features, and advantages of this invention will become apparent upon reference to the following detailed description of the invention and the accompanying drawing which illustrates a preferred embodiment thereof.

IN THE DRAWINGS

The FIGURE is a schematic diagram of the main components of a chemical recovery boiler system incorporating the unique flue gas tempering apparatus of this invention.

DETAILED DESCRIPTION OF A PREFERRED EMBODIMENT

In the FIGURE, a flue gas temperature control system, indicated generally by the numeral 10, is provided by this invention to serve as an integral part of a chemical recovery boiler exhaust system, indicated generally by the numeral 12. A suitable chemical recovery boiler furnace 14 is utilized, for example, in a wood pulping system to separate the lignin portion of the wood from the pulping liquor. A forced draft fan 16 provides air for combustion in the recovery boiler furnace 14. The flue gas resulting from the burning of the pulping liquor within the furnace of recovery boiler 14 exits the recovery boiler furnace into an exhaust duct 18. The flue gas is fed by means of the exhaust duct 18 to an evaporator or concentrator 20 where the flue gas contacts the pulping liquor prior to the liquor being introduced into the recovery boiler furnace 14. In the evaporator 20 the flue gas absorbs moisture from the pulping liquor and thereby becomes highly saturated. This saturated flue gas is then conducted by means of an exhaust duct 22 to a collection device 24 for removal of particulate matter therefrom. The collection device 24 may be of any suitable type, such as an electrostatic precipitator. The resulting flue gas is pulled from the electrostatic precipitator 24 through a conduit 26 by means of an induced draft fan 28, then to the atmosphere through an exhaust stack 30. In summary, the flue gas resulting from the burning of wood pulping liquor in the recovery boiler furnace 14 becomes highly saturated in the evaporator 20 and then passes through an electrostatic precipitator 24 for removal of particulate matter prior to its being exhausted into the atmosphere through exhaust stack 30. Once the flue gas has become highly saturated in the evaporator section 20, its travel through the electrostatic precipitator and the various exhaust duct sections prior to its reaching the atmosphere frequently results in its being subjected to cooler temperatures such that its dew point is reached and considerable condensation occurs in the electrostatic precipitator and the various exhaust duct segments. This excessive condensation has created undesirable corrosion problems on the internal components of the expensive electrostatic precipitator and the exhaust ductwork.

Therefore, it is the object of the flue gas temperature control system 10 of this invention to eliminate the problem of condensation and corrosion within the electrostatic precipitator and the exhaust ductwork. The flue gas control system 10 includes a high pressure gas burner 32 which is positioned within a heater housing 34. The high pressure gas burner 32 includes a burner tip 36 and a gas supply line 38 which incorporates a gas flow control valve 40. The gas burner 32 has inspirator openings 42 which draw in sufficient quantities of air for mixture and combustion with the gas being burned at tip 36. The resulting heated air is delivered into a feed duct 44 which incorporates a flow control damper 46. The heated air is then fed by means of ducts 48 and 50 into the exhaust duct 22 and the electrostatic precipitator 24. The flow of the heated air into the duct 22 and precipitator 24 is caused by the draft fan 28 which pulls the heated air into these components which are at a pressure less than atmospheric. The gas burner 32 of this flue gas temperature control system 10 may be controlled by means of a thermostat system (not shown) to automatically maintain the temperature of the heated air at a level sufficient to maintain the flue gas at a temperature above its dew point to thereby eliminate condensation within the exhaust ductwork and the electrostatic precipitator 24. The utilization of the flue gas temperature control system 10 to continuously add heated air to the flue gas to thereby eliminate condensation will reduce the possibility of corrosion within the ductwork and the electrostatic precipitator thereby assuring maximum service time from these componets. In addition, the flue gas temperature control system 10 may also be utilized to preheat the exhaust ductwork and the electrostatic precipitator prior to start-up of the recovery boiler furnace 14. Such start-up of a recovery boiler furnace frequently results in condensation problems when the highly saturated flue gas is brought into contact with cold ductwork in the exhaust system. In addition, the damper 46 can be utilized to adjust the quantity of heated air being introduced into the exhaust ductwork and the electrostatic precipitator to compensate for variations in quantities of flue gas passing through the system. Therefore, in addition to controlling the temperature of the flue gas, the flow rate of gas through the electrostatic precipitator can also be controlled. Thus, the addition of heated air by means of the flue gas temperature control system of this invention to the flue gases emanating from a recovery furnace eliminates condensation of these highly saturated flue gases within the exhaust ductwork and electrostatic precipitators thereby preventing corrosion of these components.

We claim:

1. In a pulping liquor recovery boiler exhaust duct system including a pulping liquor recovery boiler in which flue gases are produced by the burning of pulping liquor, an evaporator positioned downstream from said recovery boiler to receive said flue gases from said recovery boiler, an electrostatic precipitator positioned downstream from said evaporator to receive said flue gases from said evaporator for the removal of particulate matter from said flue gases, and an exhaust stack for exhausting said flue gases into the atmosphere, a flue gas temperature control system for use in maintaining the temperature of said flue gases above their dew point as they pass through said exhaust duct system from said evaporator to said electrostatic precipitator and as they pass through said electrostatic precipitator comprising, in combination:

air heating means for heating air to a temperature in excess of the dew point of said flue gases, said air heating means including a heater housing, a gas burner mounted in said heater housing, a gas supply line for supplying gas to said gas burner, and a gas flow control valve in said gas supply line for controlling the flow of gas to said gas burner;

temperature control means positioned within said exhaust duct system for controlling the temperature of the heated air produced by said air heating means;

conduit means including a first conduit branch connecting said air heating means to said exhaust duct system between said evaporator and said electrostatic precipitator and a second conduit branch connecting said air heating means to said electrostatic precipitator for conducting said heated air directly into contact with the flue gases passing through said exhaust duct system and through said electrostatic precipitator;

damper means positioned in said conduit means for regulating the quantity of said heated air which is conducted into contact with the flue gases; and blower means positioned within said exhaust duct system between said electrostatic precipitator and said exhaust stack for inducing the flow of said flue gases through said exhaust duct system and said electrostatic precipitator and for inducing the flow of said heated air into contact with said flue gases in said exhaust duct system and in said electrostatic precipitator to maintain said flue gases at a temperature above their dew point to prevent condensation within said exhaust duct system and said electrostatic precipitator.

* * * * *